Patented Aug. 13, 1946

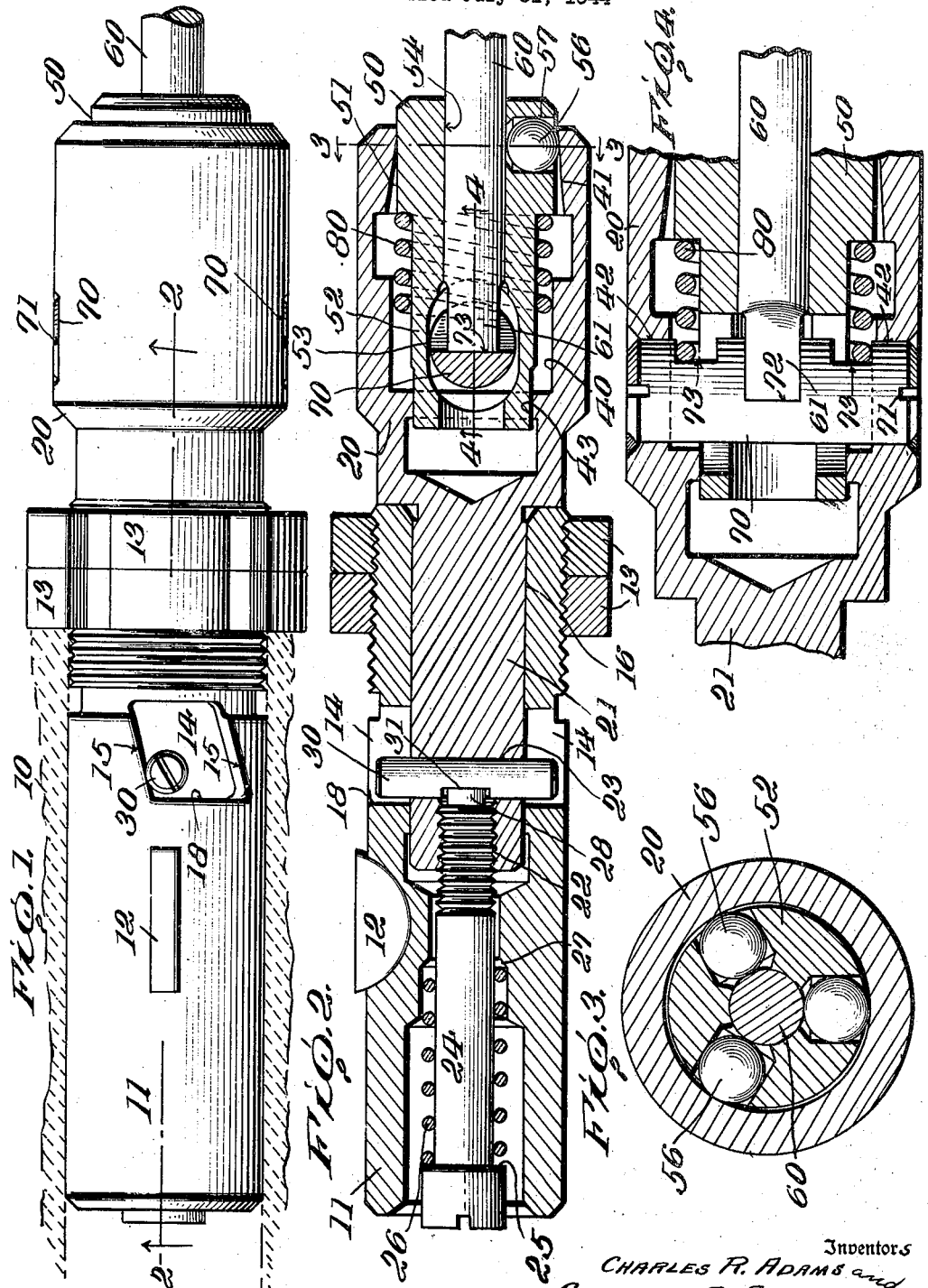

2,405,772

UNITED STATES PATENT OFFICE 2,405,772

CHUCK ASSEMBLY

Charles R. Adams and Carleton B. Clark, Keene, N. H., assignors to Kingsbury Machine Tool Corporation, Keene, N. H., a corporation of New Hampshire Application July 31, 1944, Serial No. 547,362

10 Claims. (Cl. 10—135)

This invention relates to a chuck assembly by which two members are joined for operative rotating movements.

One feature of the invention is the provision of an easily assembled and disassembled structure competent of permitting quick connection and release of the members.

Another feature of the invention is the provision of means by which the members may be joined and held fixedly against relative axial or rotative movements.

A further feature of the invention is the provision of a structure for supporting a threading tap in fixed relation to a supporting head so that relative axial and rotative movements are prevented, together with means for assuring a smooth and uniform feeding of the tap without excessive demands upon the tap for procuring the required axial movement in the work.

With these and other features in view, an illustrative form of practicing the invention is shown in the accompanying drawing, in which:

Figure 1 is an elevation of a chuck assembly according to this invention, with parts of a driving spindle for the same shown in dotted lines.

Figure 2 is a diametrical sectional view substantially on line 2—2 of Figure 1.

Figure 3 is a radial sectional view substantially on line 3—3 of Figure 2.

Figure 4 is a fragmentary diametrical view substantially on line 4—4 of Figure 2.

In the drawing, the invention is illustrated as applied to a chuck assembly for a tapping machine having a spindle 10 which is rotated at the proper speed, and can be given a forward feeding motion, forwardly or toward the right in Figures 1, 2 and 4, at a rate slightly less than the feeding demanded by the rotational speed and the pitch of the tap. Such machines are old and well known, and no claim thereto is made in this application.

The spindle 10 is hollow and receives the body 11, which is hollow and which is preferably provided with a key 12 to compel its rotation with the spindle 10. Adjusting and clamping nuts 13 are provided on a threaded portion of the body 11 for engagement with the end of the spindle 10 whereby to determine the distance from this spindle end to the end of the tap at the moment of starting the tap in the work. The body 11 has a diametrical aperture providing the slots 14 at opposite faces thereof. In Figure 1 it will be noted that the axially directed surfaces 15 of the visible slot are parallel, but have a slight helical direction, at an angle of around 10 degrees with respect to the axis. The peripheral dimension of the slot 14 (Figure 1) is about 90 degrees. It will be understood that the other slot, not visible in Figure 1, is identical.

A casing member 20 has a stem 21 which fits closely in the portion 16 of the body 11, and has a threaded axial hole 22 at its rearward end. A diametrical hole 23 receives the driving pin 30. A stem extension 24 is threaded into the hole 22, and has an enlarged rearward end providing a shoulder 25. A coiled spring 26 surrounds the stem extension 24 and bears against the shoulder 25 and also against an internal shoulder 27 of the body 11, and thereby acts to urge the casing 20 with its stem in a rearward direction until the pin 30 comes against the rear walls 18 of the slots 14.

The pin 30 projects beyond the peripheral surface of the stem portion 16, into the slots 14, but preferably terminates below the outer peripheral surface of adjacent parts of the body 11. This pin 30 has a notch 31 into which engages the end 28 of the stem extension 24, so that when the parts are assembled, the pin 30 is held against sliding motion in the direction of its axis and also is held against rotation about its axis.

The forward end of the casing 20 is enlarged and has a cavity 40 which includes an inclined wall portion 41 convergent toward the front end of the casing, being the right hand end in the figures. The casing 20 also has a diametrical hole 42 of circular section intersecting the cavity 40.

A collet bushing 50 has an enlarged front end terminating at a rearward shoulder 51, and an extension 52 which has therein a diametrical aperture providing an axially elongated slot 53 through the bushing. This bushing 50 also has an axial hole 54 which may be reamed or ground accurately to shape and size for receiving the shank of a tool 60, illustratively a tap having a squared end 61. In the illustrated construction, the rear end of the bushing 50 is closely received in a guideway 43 of the casing 20.

A cross pin 70 closely fits the circular hole 42 in the casing 20 and is of such length that its ends engage the casing 20, being provided with kerfs 71 by which the pin may be rotated about its own axis, that is, about an axis transverse to the general axis of the chuck assembly. The pin 70 has a notch 72 at the middle of its length, for receiving the squared end 61 of the tap shank. This notch preferably extends beyond the axis of the pin 70 and has flat side and bottom walls for engaging the tap. The pin 70 also has flattened portions 73 provided by notches therein.

A coil spring 80 bears at its forward end against the shoulder 51 of the bushing 50, and at its rear end is received, in the assembled condition of the parts, in the notches 73, preferably closely conforming to the outer walls of these notches, and also itself being guided and supported against movements transverse to the chuck axis by location adjacent the wall of the cavity 40 in the casing 20. Thus, the spring 80, in the assembled condition of the parts, delivers its reaction onto the pin 70 wherewith this reaction is transmitted to the casing 20: and this reaction force itself imposes a limitation upon the rotation of the pin 70 about its own axis, and thus prevents an accidental turning of this pin. However, upon engaging a screw driver with the kerf 71, the pin 70 can be rotated in the absence of a tap, and thus a smooth surface brought opposite the spring 80, whereupon the pin 70 may be slid axially out of the casing 20 and the bushing 50, and these parts then separated from one another. Reassembly can be accomplished in a reverse manner, by introducing the pin through the casing 20, presenting the slot 53 in position, and moving the spring 80 by a tool introduced from the opposite end of the hole 42, until the pin can be slid into final position, and then rotated about its axis until the spring 80 engages the notches 73 as before.

The collet bushing 50 carries a clutch means for holding the member 60, illustratively a tap, in definite and fixed position so that it cannot be moved forwardly relative to the casing 20. For this purpose, a ball 56 is received in a closely fitting radial aperture 57 of the bushing 50, this aperture preferably being reduced at its inner end, to limit the inward movement of the ball. It is preferred to provide a number of such clutch devices, illustrated by the three balls 56 shown in Figure 3, in order to distribute the effort. When the spring 80 acts to move the bushing 50 forwardly or toward the right in Figure 2, each ball 56 is carried along and travels on the inclined wall portion 41, thus being forced radially inwardly as the wall converges, so that the ball engages the shank of the tap 60 and holds the same against forward axial movement. Upon pressing the bushing 50 inwardly or toward the left in Figure 2, the ball is released, and the tap can be easily withdrawn.

During employment, when a tap has been removed and a new one is to be substituted, the end of the new tap 60 is introduced into the hole 54 and pressed in. The bushing 50 is also forced inward, so that each ball 56 permits the continued movement of the tap 60, which may also be rotated slightly about its axis as necessary to cause its flattened or square end 61 to properly engage in the notch 72. This notch is in the pin 70 and hence fixed with respect to the casing 20, so that the tap 60 can be pressed to a rigid and fixed setting relative to the casing 20. When the bushing 50 is released again, under such condition, each ball 56 is caused to grip the tap, and thereby hold the same against withdrawal.

When this assembly is used for tapping, the spindle 10 is caused to rotate and to advance forwardly or toward the right in the figures, at a rate slightly less than that required by the speed of rotation and the pitch of the tap. When the machine is being employed on repetitive work, the prior adjustment of nuts 13 assures that the tap will engage the work at a definite time after the feeding starts. As the tap contacts and starts into the work piece, it is forced solidly into the work for the first one or two revolutions at a rate of a few thousandths of an inch less per revolution than the normal pitch of the tap, until the tap starts to cut its own thread. The tap now takes charge and begins to pull itself into the work. The action of the chuck clutch causes the tap 60 to remain fixed relative to the casing 20, and this casing tends to move forwardly at a rate slightly greater than that of the spindle 10 as, in this example, a few thousandths of an inch per revolution; for this purpose sliding in the bore hole 16 of the body 11 against the action of the spring 26.

When the tapping is completed, the spindle and its feed are reversed, and the tap is caused to rotate backwardly and be withdrawn. At the moment of reversal, the pin 30 remains stationary due to the backlash provided by the width of the slots 14 between the walls 15. This compensates for backlash in the feed train of the reversing motors. In practice, slots each having widths of 90 degrees of the circumference of the body 11 have been found effective, with a pin 30 having a corresponding circumferential dimension of about 30 degrees. When the other slot wall 15 engages the pin 30, the retrograde driving begins; and again there is assistance to the axial movement of pin 30 in the slot, by reason of the helical shaping.

The rigid support of the tap in the collet, and the accurate positioning of the tap end and its driving at contact with the work, assures accurate and definite tapping of blind holes, and prevents cramping or jamming by chips in the bottom of a blind hole. Further, it will be noted that this rigidity and accuracy of presentation does not depend upon the customary finely-dimensioned notching along the shank of the tap, thus avoiding the expense and trouble of such fitting. As the tap 60 moves forwardly, in advance of the feed of the body 11 and the spindle 10, the driving pin 30 leaves the rear walls 18 of the slots 14, and the helical or inclined shape of the slot walls 15 causes the friction of these walls against the pin to be reduced, thereby decreasing the load upon the tap consequent to its progression faster than the body 11. This is an advantage particularly in tapping small or fine pitch holes or in tapping soft materials, as better threads are cut by relieving the material from a part of the axial effort.

It is obvious that the invention is not limited to the illustrative form of practice, but that it may be employed in many ways within the scope of the appended claims.

We claim:

1. A chuck for a rotative member having a rearward flattened end, comprising a rotatable casing, a collet bushing axially slidable in the casing and having a radial hole in the front portion thereof and a diametrical hole of axially elongated form in the rear portion thereof, a spring engaging said bushing to press the bushing forwardly, a ball in said radial hole and a cooperating inclined wall portion on the casing, and a rotatable cross pin engaged in the casing and passing through said hole; said cross pin being flattened to receive the rear end of the spring and therewith transmit the reaction thereof to the casing, said cross pin also having a notch for receiving the flattened end of the said rotative member and therewith being effective to cause the casing and member to turn together and to limit the axial rearward movement of the member; the bushing having an axial aperture to receive the member and cooperating with the spring, ball and inclined wall portion so that, when the flattened end is seated in said notch, the bushing acts under the urge of said spring to cause the ball to travel along the wall portion and move into position for gripping and holding the member against forward axial movement relative to the casing; said cross pin being rotatable about an axis radial to the casing and being in one rotated position effective to receive the spring and engage the flattened end of the member as aforesaid and being thereby prevented from sliding relative to the casing and having a smooth portion along the length of a part of its periphery so that it is in another rotated position effective to permit sliding movement out of the casing: said bushing being effective when forced rearwardly against the action of the spring to cause the ball to release said member whereupon the same may be withdrawn forwardly.

2. A chuck assembly comprising a casing, a round pin slidable along and rotatable about a transverse axis in said casing, a tool holding collet axially slidable in said casing and having a slot through which the pin passes when the parts are assembled, and a spring positioned between the collet and pin in assembled condition whereby to force the bushing forwardly, said pin being notched for receiving the rear end of the spring whereby the spring acts in assembled condition to prevent sliding of the pin and to impose resistance against accidental rotation of the pin.

3. A chuck assembly as in claim 2, in which the tool holding collet includes tool clamping elements actuated by the forward movement of the collet under the urge of said springs and released by rearward movement of the collet against the pressure of the spring.

4. A chuck assembly as in claim 2, in which the tool holding collet has a shoulder forwardly of the pin for receiving the forward end of the spring and has a rearward extension containing said slot, and in which the rear end wall of the slot by engagement with the pin establishes limitation upon the forward movement of the collet.

5. A tapping chuck comprising a hollow body to be rotated about its axis, an intermediate member axially slidable in said body and having an axially extending aperture at its front end, a tool receiving member axially slidable in said aperture, a first spring engaged with the intermediate member effective to urge the latter rearwardly, a second spring engaged with the intermediate member and the tool receiving member effective to urge the tool receiving member forwardly, and means cooperating with the tool receiving member and the intermediate member effective to grip and hold a tool in predetermined position against both rotative and endwise movements relative to the intermediate member, said body having a slot and said intermediate member having a part projecting into said slot, said slot having walls directed helically about the axis of the body and being of greater peripheral width than said part whereby the intermediate member may make a restricted rotation relative to the body within the limits established by the slot walls and said part may move axially in said slot.

6. A tapping chuck comprising a hollow body to be rotated about its axis, an intermediate member axially slidable in said body and having an axially extending aperture at its front end, a tool receiving member axially slidable in said aperture, a first spring engaged with the intermediate member effective to urge the latter rearwardly, a second spring engaged with the intermediate member and the tool receiving member effective to urge the tool receiving member forwardly, said body having movable stop means thereon effective to regulate the distance from said stop means to the operating front end of the tool whereby to control the position of said body when the tool encounters the work, and means cooperating with the tool receiving member and the intermediate member effective to grip and hold a tool in predetermined position against both rotative and endwise movements relative to the intermediate member, said body and intermediate member having motion limiting means including a slot in said body and a part on said intermediate member projecting into said slot, said slot having walls directed helically at a pitch angle of about 10 degrees and having a peripheral angular dimension about 60 degrees greater than said part whereby the intermediate member may move axially and make a restricted rotation relative to the body within the limits established by the motion limiting means.

7. A tapping chuck comprising a hollow body to be rotated about its axis and to be moved axially for feeding the tap into the work, a tap holder structure having a stem located in said hollow body, a spring acting between the stem and body to urge the tap holder structure rearwardly, and cooperative driving means on said structure and body including a helical wall and a member engageable with said helical wall to cause the body and structure to turn together, said helical wall being angularly directed and effective to produce during each turning an axial force component between said wall and member tending to advance the tap holder structure in the direction of axial movement of the rotating tap in the work.

8. A tapping chuck comprising a hollow body to be rotated about its axis, a casing having a stem in said body, said stem being in part spaced from the internal wall of the body and having a shoulder, a spring surrounding the stem and acting between said shoulder and the body to urge the casing rearwardly, said body having a slot with a helical wall, a driving member of lesser peripheral and axial dimensions than said slot and projecting from the stem into said slot for causing the body and casing to turn together, a tap holder formed on said casing, the angular direction of said helical wall being selected to cause the pressure between the driving member and the body to exert an axial component of force tending to advance the tool holder in the direction of the axial movement of the rotating tap in the work.

9. A tapping chuck comprising a hollow body to be rotated about its axis, a casing having a stem in said body, said stem being in part spaced from the internal wall of the body and having a shoulder, a spring surrounding the stem and acting between said shoulder and the body to urge the casing rearwardly, said body having a slot with opposed helical walls, a driving member of lesser peripheral and axial dimensions than said slot and projecting from the stem into said slot and movable therein to engage a first helical wall while tapping and to engage the second helical wall while withdrawing and effective for causing the body and casing to turn together, and a tap holder formed on said casing, the angular direction of the first helical wall being selected to cause the pressure between the driving member and the body during tapping to exert an axial component of force for feeding the tap forward and the angular direction of the second helical wall being selected to cause the pressure between the driving member and the body during withdrawal to exert an axial component of force for moving the tap rearward.

10. A chuck assembly comprising a casing having a central longitudinal aperture open at its front end and a transverse aperture intersecting said longitudinal aperture and having a portion of circular cross-section, a pin slidable in said transverse aperture and fitting said portion and rotatable about the axis thereof, a tool holding collet axially slidable in said longitudinal aperture having a shoulder near its front end and having a slot in which the pin is located when the parts are assembled, the wall of the longitudinal aperture and the portion of the collet rearward of the shoulder providing an annular space, a coil spring located in said space between the shoulder and pin for urging the collet forwardly, and tool gripping devices actuated into tool gripping position by forward movement of the collet, said pin being notched at one side to provide driving means for the shank of the tool located in said collet.

CHARLES R. ADAMS.
CARLETON B. CLARK.